(12) United States Patent
Ohishi et al.

(10) Patent No.: US 10,500,666 B2
(45) Date of Patent: Dec. 10, 2019

(54) WEAR-RESISTANT COMPONENT AND METHOD FOR PRODUCING THE SAME

(71) Applicant: KOMATSU LTD., Tokyo (JP)

(72) Inventors: Masayuki Ohishi, Neyagawa (JP); Masaharu Amano, Hirakata (JP)

(73) Assignee: KOMATSU LTD., Tokyo (JP)

( * ) Notice: Subject to any disclaimer, the term of this patent is extended or adjusted under 35 U.S.C. 154(b) by 341 days.

(21) Appl. No.: 15/500,689

(22) PCT Filed: Nov. 18, 2014

(86) PCT No.: PCT/JP2014/080538
§ 371 (c)(1),
(2) Date: Jan. 31, 2017

(87) PCT Pub. No.: WO2016/079811
PCT Pub. Date: May 26, 2016

(65) Prior Publication Data
US 2017/0216951 A1 Aug. 3, 2017

(51) Int. Cl.
*B23K 9/04* (2006.01)
(52) U.S. Cl.
CPC .................................. *B23K 9/04* (2013.01)
(58) Field of Classification Search
None
See application file for complete search history.

(56) References Cited

U.S. PATENT DOCUMENTS

| 5,852,272 | A | 12/1998 | Amano |
| 6,118,098 | A | 9/2000 | Amos et al. |
| 9,121,237 | B2 * | 9/2015 | Kumar ............. C23C 30/005 |

FOREIGN PATENT DOCUMENTS

| CN | 1313800 A | 9/2001 |
| CN | 103706921 A | 4/2014 |
| EP | 2740908 A1 | 6/2014 |
| JP | H03-23025 A | 1/1991 |
| JP | H05-77042 A | 3/1993 |
| JP | H08-47774 A | 2/1996 |
| JP | 2008-000763 A | 1/2008 |
| JP | 2013-046928 A | 3/2013 |

OTHER PUBLICATIONS

Feb. 17, 2015 International Search Report issued in International Patent Application No. PCT/JP2014/080538.

* cited by examiner

*Primary Examiner* — Adam Krupicka
(74) *Attorney, Agent, or Firm* — Oliff PLC (57) ABSTRACT

A tooth which is an example of a wear-resistant component includes a base made of a first metal, and an overlay disposed in contact with the base to cover a covered region that is a part of a surface of the base. In an overlay edge portion corresponding to a boundary between the covered region and an exposed region other than the covered region on the surface of the base, the exposed region and a surface of the overlay are flush with each other to form a forged surface.

9 Claims, 7 Drawing Sheets

<COMPARATIVE EXAMPLE>

FIG.13  <COMPARATIVE EXAMPLE>

WEAR-RESISTANT COMPONENT AND METHOD FOR PRODUCING THE SAME

TECHNICAL FIELD

The present invention relates to a wear-resistant component and a method for producing the wear-resistant component.

BACKGROUND ART

Components constituting hydraulic excavators, bulldozers, wheel loaders, and other work machines that operate in an environment where sand and other materials exist include wear-resistant components such as rippers and teeth. Such a wear-resistant component may have an overlay formed in a region where particularly high wear resistance is desired. One overlay available has hard particles dispersed in a matrix such as steel. Such an overlay can be formed, for example, by overlaying welding (see, for example, Japanese Patent Application Laid-Open No. 2008-763 (Patent Literature 1) and Japanese Patent Application Laid-Open No. H8-47774 (Patent Literature 2)).

CITATION LIST

Patent Literature

Patent Literature 1: Japanese Patent Application Laid-Open No. 2008-763
Patent Literature 2: Japanese Patent Application Laid-Open No. H8-47774

SUMMARY OF INVENTION

Technical Problem

A wear-resistant component having an overlay is obtained by preparing a base shaped into a desired shape and by forming an overlay so as to cover a region of the base where particularly high wear resistance is desired. While forming the overlay can improve durability of the wear-resistant component, the component may suffer a disadvantage caused by the overlay formed. For example, an overlay formed on a bucket tooth of a hydraulic excavator may increase penetration resistance of the tooth when the tooth penetrates into earth and sand.

An object of the present invention is to prevent a disadvantage in a wear-resistant component having an overlay that would otherwise be caused by forming the overlay.

Solution to Problem

A wear-resistant component according to the present invention includes a base made of a first metal, and an overlay disposed in contact with the base to cover a covered region that is a part of a surface of the base. In an overlay edge portion corresponding to a boundary between the covered region and an exposed region other than the covered region on the surface of the base, the exposed region and a surface of the overlay are flush with each other to form a forged surface.

As described above, an overlay is formed on a surface of a base by overlaying welding or other technique. In a wear-resistant component with an overlay formed, in an overlay edge portion corresponding to a boundary between a region (covered region) covered with the overlay and a region (exposed region) other than the covered region on the surface of the base, a step is usually formed between the surface of the overlay and the exposed region of the base. This step causes a disadvantage due to the formation of the overlay. For example, an overlay may be formed on a bucket tooth of a hydraulic excavator. While the overlay formed can improve the wear resistance of the tooth, the tooth may suffer increased penetration resistance in earth and sand due to the step formed. When an overlay is formed on a component that is for use in contact with another component, the component may not be able to sufficiently achieve a desired contacting state with the other component because of the step.

In the wear-resistant component according to the present invention, in the overlay edge portion, the exposed region of the base and the surface of the overlay are flush with each other. This prevents the disadvantage due to the formation of the overlay that would otherwise be caused by the step described above. With the overlay edge portion included in the forged surface, the working step such as cutting for making the exposed region of the base and the surface of the overlay flush with each other can be omitted. Consequently, the working on the overlay edge portion where the difference in hardness is great and the working on the overlay which is high in hardness can be avoided. Thus, according to the wear-resistant component of the present invention, it is possible to provide a wear-resistant component having an overlay which can prevent a disadvantage that would otherwise be caused by forming the overlay.

In the wear-resistant component described above, the overlay may include a matrix made of a second metal, and hard particles dispersed in the matrix. This facilitates formation of an overlay excellent in wear resistance.

In the wear-resistant component described above, the hard particles located in an overlay surface region may be arranged side by side while being embedded in the overlay, the overlay surface region being a region within an average particle diameter of the hard particles from the surface of the overlay. This prevents the hard particles from being arranged protruding noticeably from the surface of the overlay. As a result, the hard particles are prevented from falling off during the use of the wear-resistant component. It should be noted that the average particle diameter of the hard particles may be obtained by observing a cross section perpendicular to the surface of the overlay with an optical microscope, and by calculating an average of the diameters often hard particles observed.

In the wear-resistant component described above, the hard particles located in the overlay surface region may be arranged in contact with the surface of the overlay. With this, the region of a hard particle exposed from the surface of the overlay becomes small, which prevents the hard particle from falling off.

In the wear-resistant component described above, among the hard particles located in the overlay surface region, any hard particle having a region exposed from the surface of the overlay may have an acute central angle (of less than 90°) corresponding to the region exposed from the surface of the overlay. With this, the region of a hard particle exposed from the surface of the overlay becomes small, which prevents the hard particle from falling off.

In the wear-resistant component described above, in a region including an interface between the overlay and the base, the overlay may include a protrusion that protrudes toward the base. This prevents the overlay from coming off the base.

In the wear-resistant component described above, the protrusion may have at least a part of the hard particle received therein. This more reliably prevents the overlay from coming off the base.

A method for producing a wear-resistant component according to the present invention includes the steps of: preparing a base member made of a first metal; forming an overlay to come into contact with and cover a covered region that is a part of a surface of the base member; and forging the base member having the overlay formed, such that an overlay edge portion corresponding to a boundary between the covered region and an exposed region other than the covered region on the surface of the base is worked.

In the wear-resistant component producing method according to the present invention, the base member having the overlay formed is forged such that the overlay edge portion is worked. This produces a wear-resistant component having an overlay edge portion in which the surface of the overlay and the exposed region of the base are flush with each other to form a forged surface, thereby preventing a disadvantage that would otherwise be caused by formation of the overlay due to the step described above. With the overlay edge portion included in the forged surface, the working step such as cutting for making the exposed region of the base and the surface of the overlay flush with each other can be omitted. Consequently, the working on the overlay edge portion where the difference in hardness is great and the working on the overlay which is high in hardness can be avoided. Thus, according to the wear-resistant component producing method of the present invention, it is possible to produce a wear-resistant component having an overlay which can prevent a disadvantage that would otherwise be caused by forming the overlay.

In the wear-resistant component producing method described above, the step of forging the base member having the overlay formed may include hot forging the base member having the overlay formed. Hot forging adopted can facilitate forging of the base member with the overlay formed.

In the wear-resistant component producing method described above, the step of forming the overlay may include forming the overlay including a matrix made of a second metal and hard particles dispersed in the matrix. This facilitates formation of an overlay excellent in wear resistance.

Effects of Invention

As is clear from the above description, according to the wear-resistant component and its producing method of the present invention, it is possible to prevent a disadvantage in a wear-resistant component having an overlay that would otherwise be caused by forming the overlay.

DESCRIPTION OF EMBODIMENTS

An embodiment of the present invention will now be described. In the following drawings, the same or corresponding parts are denoted by the same reference numerals, and the description thereof will not be repeated.

Figure 1:
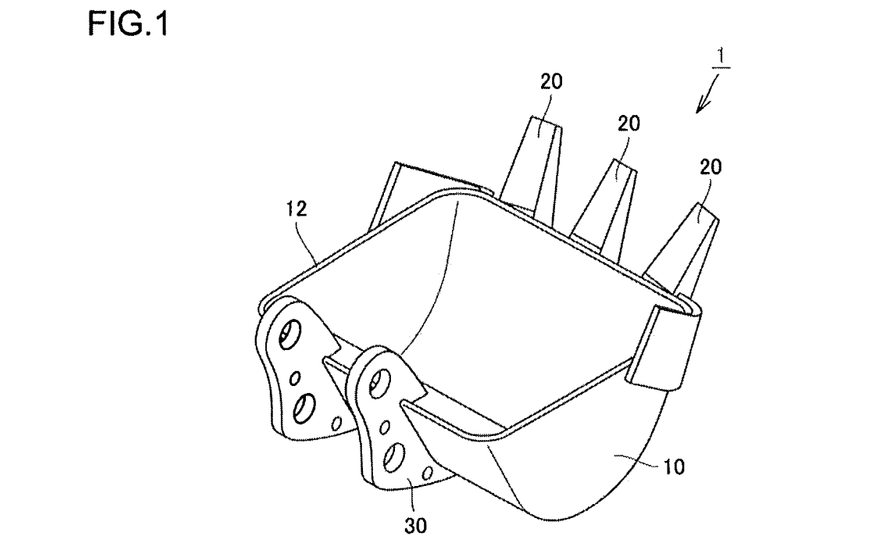
FIG. 1 is a schematic perspective view showing the structure of a bucket of a hydraulic excavator.
Figure 2:
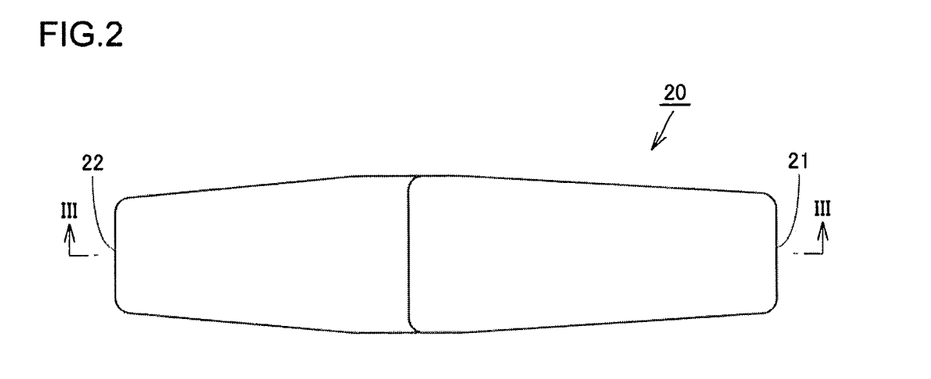
FIG. 2 is a schematic plan view showing the structure of a tooth.
Figure 3:
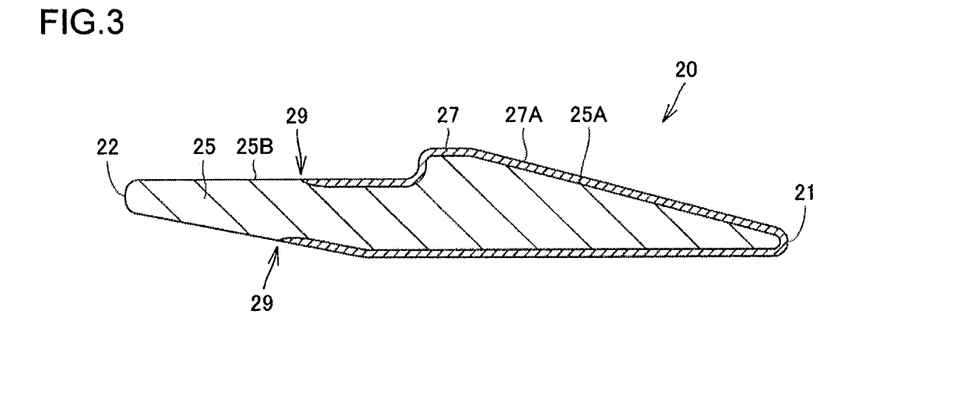
FIG. 3 is a schematic cross-sectional view taken along the line III-III in FIG. 2.

A wear-resistant component according to the present embodiment will be described by giving as an example a bucket tooth of a hydraulic excavator. FIG. 1 is a schematic perspective view showing the structure of a bucket of a hydraulic excavator. FIG. 2 is a schematic plan view showing the structure of a tooth. FIG. 3 is a schematic cross-sectional view taken along the line III-III in FIG. 2.

Referring to FIG. 1, a bucket 1, which is attached to a tip end of an arm (not shown) of a hydraulic excavator, is for excavating earth and sand. The bucket 1 includes: a main body 10, made up of a plate-like member and having an opening; a plurality of (in the bucket 1 shown in FIG. 1, three) teeth 20 attached to the main body 10 to partially protrude from a periphery 12 of the opening of the main body 10 on its excavating side; and a mounting portion 30 disposed on a side of the main body 10 opposite to the side where the teeth 20 are attached. The bucket 1 is supported by the arm of the hydraulic excavator via the mounting portion 30. When the bucket 1 is used for excavation, the teeth 20 enter into earth and sand first. The teeth 20 are thus required to have high wear resistance (earth and sand abrasion resistance). The teeth 20 are earth and sand abrasion resistant components that are machine components used for applications where they come into contact with earth and sand.

A tooth 20 includes a tip end 21 and a proximal end 22, as shown in FIG. 2. The tooth 20 is attached to the main body 10 at its proximal end 22 side, with its tip end 21 side protruding from the periphery 12 of the opening of the bucket 1. The tooth 20 is used while being in contact with another component which is the main body 10. The bucket 1 enters into earth and sand from the tip end 21 side of the tooth 20. The tip end 21 side of the tooth 20 thus requires particularly high wear resistance (earth and sand abrasion resistance).

Referring to FIG. 3, a tooth 20 includes a base 25 made of a first metal, and an overlay 27 disposed in contact with the base 25 to cover a covered region 25A that is a part of a surface of the base 25. As the first metal for the base 25, for example, carbon steel for machine structural use or alloy steel for machine structural use specified in JIS standard (for example, S45C or SCM435, as well as manganese steel (SMn), chromium steel (SCr), or chromium-molybdenum steel (SCM) containing an equivalent amount of carbon) can be adopted. In an overlay edge portion 29 corresponding to a boundary between the covered region 25A and an exposed region 25B that is a region other than the covered region 25A on the surface of the base 25, the exposed region 25B and a surface 27A of the overlay 27 are flush with each other to form a forged surface. The surface 27A of the overlay 27 is entirely the forged surface.

Figure 4:
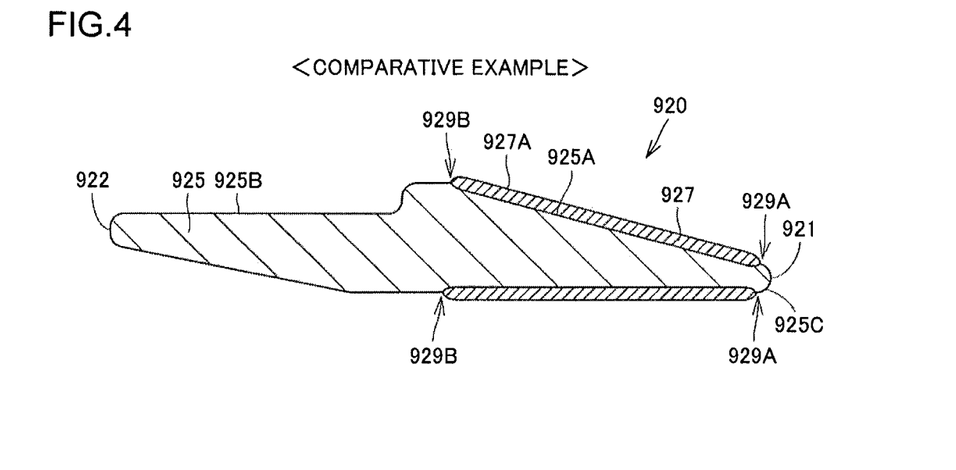
FIG. 4 is a schematic cross-sectional view showing the structure of a tooth of a Comparative example.

FIG. 4 is a schematic cross-sectional view showing the structure of a tooth with an overlay, as a Comparative example. In the case of forming an overlay for improving wear resistance at and near a tip end of a tooth, it is common to form the overlay on a steel base having a desired shape. Referring to FIG. 4, the tooth 920 of the Comparative example, which is a typical tooth having an overlay, includes a tip end 921 and a proximal end 922. An overlay 927 is formed on the tip end 921 side of the tooth 920. The overlay 927 is formed by overlaying welding, for example, to cover a covered region 925A of a base 925 that has been shaped into a desired shape. Thus, in overlay edge portions 929A, 929B corresponding to boundaries between the covered region 925A and exposed regions 925B, 925C other than the covered region 925A, steps are formed between the exposed regions 925B, 925C and a surface 927A of the overlay 927. Such steps increase penetration resistance of the tooth 920 in earth and sand. Further, the overlay 927 is formed after the base 925 is shaped. It is difficult to form the overlay 927 in the vicinity of the tip end 921. Thus, in the region including the tip end 921, the tip-end exposed region 925C is formed which is uncovered with the overlay 927. This tip-end exposed region 925C having low wear resistance accelerates the progress of wear and increases the replacement frequency of the tooth 920.

Referring to FIG. 3, according to the tooth 20 in the present embodiment, the exposed region 25B and the surface 27A of the overlay 27 are flush with each other in the overlay edge portion 29. This can prevent an increase in penetration resistance otherwise caused by a step in the overlay edge portion 29. With the overlay edge portion 29 included in the forged surface, the working step such as cutting for making the exposed region 25B and the surface 27A of the overlay 27 flush with each other can be omitted. Consequently, the working on the overlay edge portion 29 where the difference in hardness is great and the working on the overlay 27 which is high in hardness can be avoided. Thus, according to the tooth 20 in the present embodiment, it is possible to prevent a disadvantage that would otherwise be caused by forming the overlay 27. Further, an overlay may be formed on a base member and then forging may be performed to shape a region including the tip end 21. By doing so, the region including the tip end 21 can readily be covered with the overlay 27, as shown in FIG. 3, and a tooth 20 having high wear resistance can be obtained.

Figure 5:
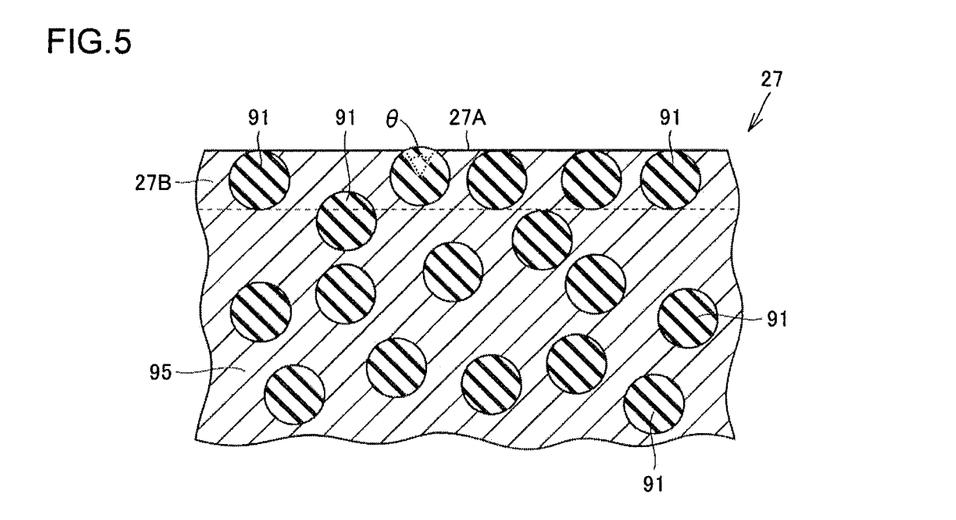
FIG. 5 is a schematic cross-sectional view showing the structure of an overlay at and near its surface.
Figure 6:
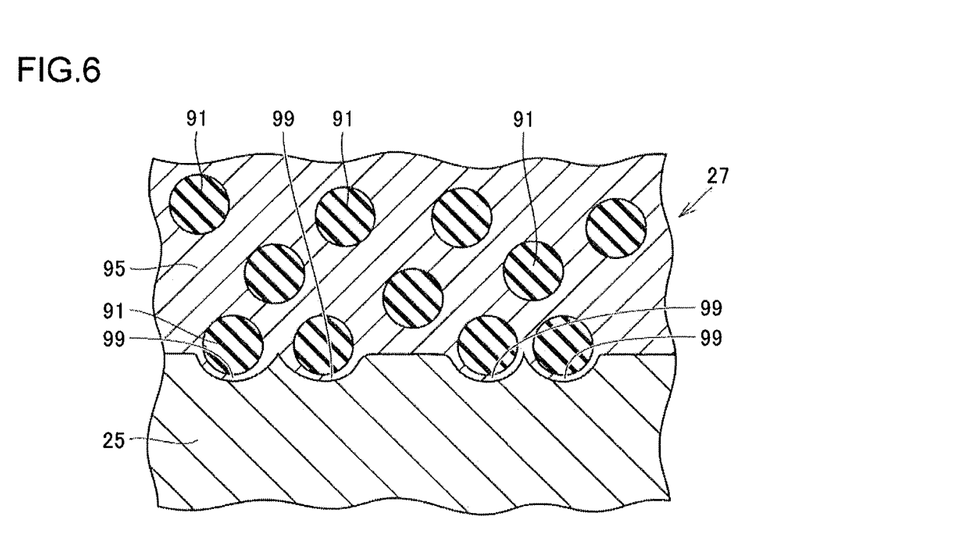
FIG. 6 is a schematic cross-sectional view showing the structure at and around an interface between the overlay and a base.

A structure of the overlay 27 will now be described. FIG. 5 is a schematic cross-sectional view showing the structure of an overlay at and near its surface. FIG. 6 is a schematic cross-sectional view showing the structure at and around an interface between the overlay and a base. Referring to FIGS. 5 and 6, the overlay 27 includes a matrix 95 made of a second metal, and hard particles 91 dispersed in the matrix 95. The second metal forming the matrix 95 may be, for example, a mixture of a metal derived from a welding wire and the first metal forming the base 25. As the hard particles 91, particles having higher hardness than the matrix 95, for example particles of cemented carbide, may be adopted. The overlay 27 has higher wear resistance (earth and sand abrasion resistance) than the base 25.

Referring to FIG. 5, the surface 27A of the overlay 27 is a forged surface. The hard particles 91 located in an overlay surface region 27B, which is a region within an average particle diameter of the hard particles 91 from the surface 27A of the overlay 27, are arranged side by side while being embedded in the overlay 27. This prevents the hard particles 91 from being arranged protruding noticeably from the surface 27A of the overlay 27. This consequently prevents the hard particles 91 from falling off during the use of the tooth 20, leading to improved wear resistance of the tooth 20.

The hard particles 91 located in the overlay surface region 27B may be arranged in contact with the surface 27A of the overlay 27, as shown in FIG. 6. With this, the region of a hard particle 91 exposed from the surface 27A of the overlay 27 becomes small, which prevents the hard particle 91 from falling off.

A hard particle 91 having a region exposed from the surface 27A of the overlay 27 preferably has an acute central angle θ (of less than 90°) corresponding to that exposed region. With this, the region of a hard particle 91 exposed from the surface 27A of the overlay 27 becomes small, which prevents the hard particle 91 from falling off.

Referring to FIG. 6, the overlay 27 includes protrusions 99 that protrude toward the base 25 in a region including an interface between the overlay 27 and the base 25. The protrusions 99 provide an anchor effect to prevent the overlay 27 from coming off the base 25. A protrusion 99 receives at least a part of a hard particle 91. This more reliably prevents the overlay 27 from coming off the base 25. There exists the matrix 95 of the overlay 27 between the base 25 and the hard particle 91 received in the protrusion 99. The hard particle 91 received in the protrusion 99 is not in contact with the base 25. The hard particle 91 has its center located outside the protrusion 99 (i.e., a part of the hard particle 91 having a volume less than a half thereof is received in the protrusion 99). One hard particle 91 is received in one protrusion 99. Each protrusion 99 has a depth that is smaller than the radius of the hard particle 91 received in the protrusion 99.

Figure 7:
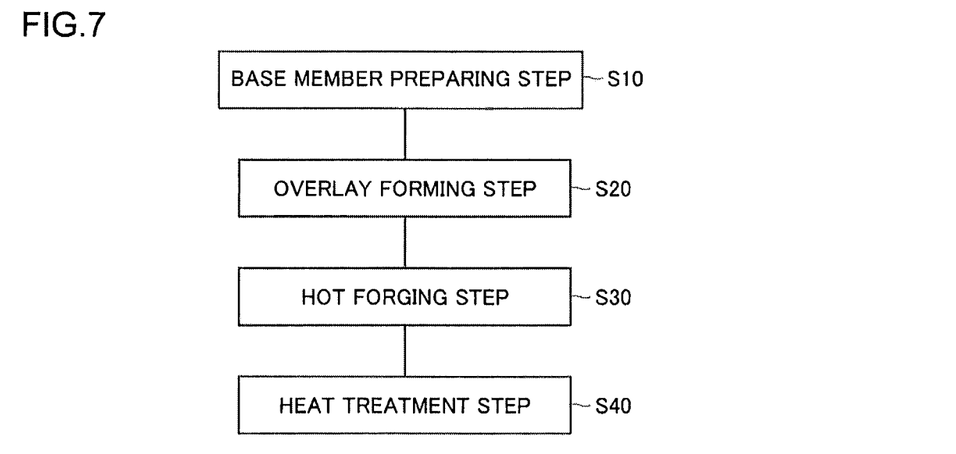
FIG. 7 is a flowchart schematically illustrating a method for producing a tooth.
Figure 8:
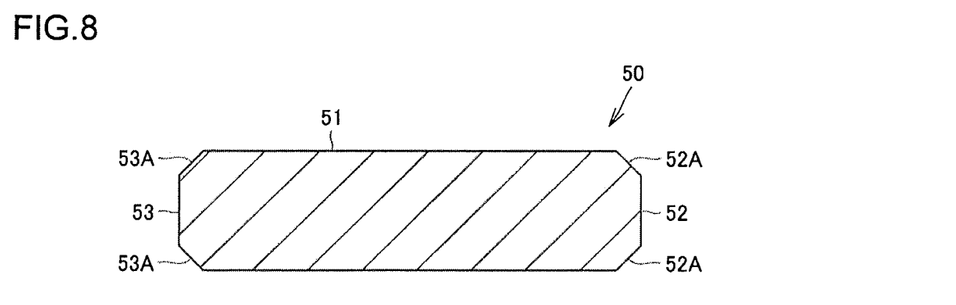
FIG. 8 is a schematic cross-sectional view illustrating the tooth producing method.
Figure 9:
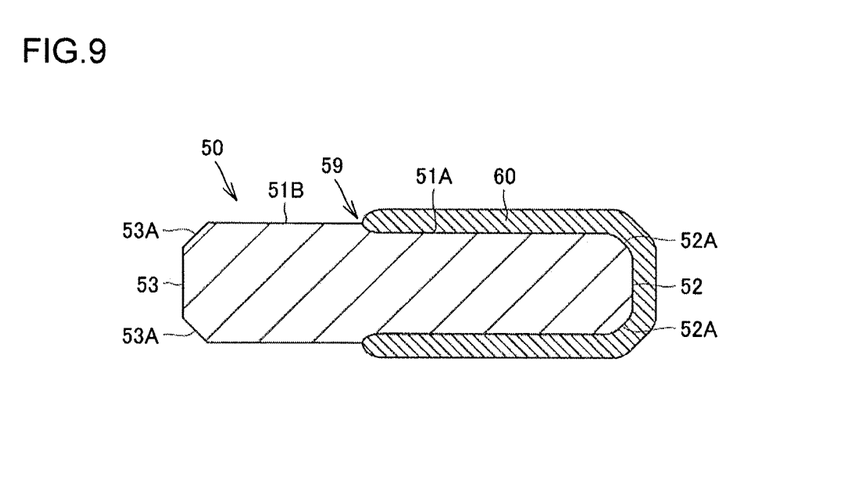
FIG. 9 is a schematic cross-sectional view illustrating the tooth producing method.
Figure 10:
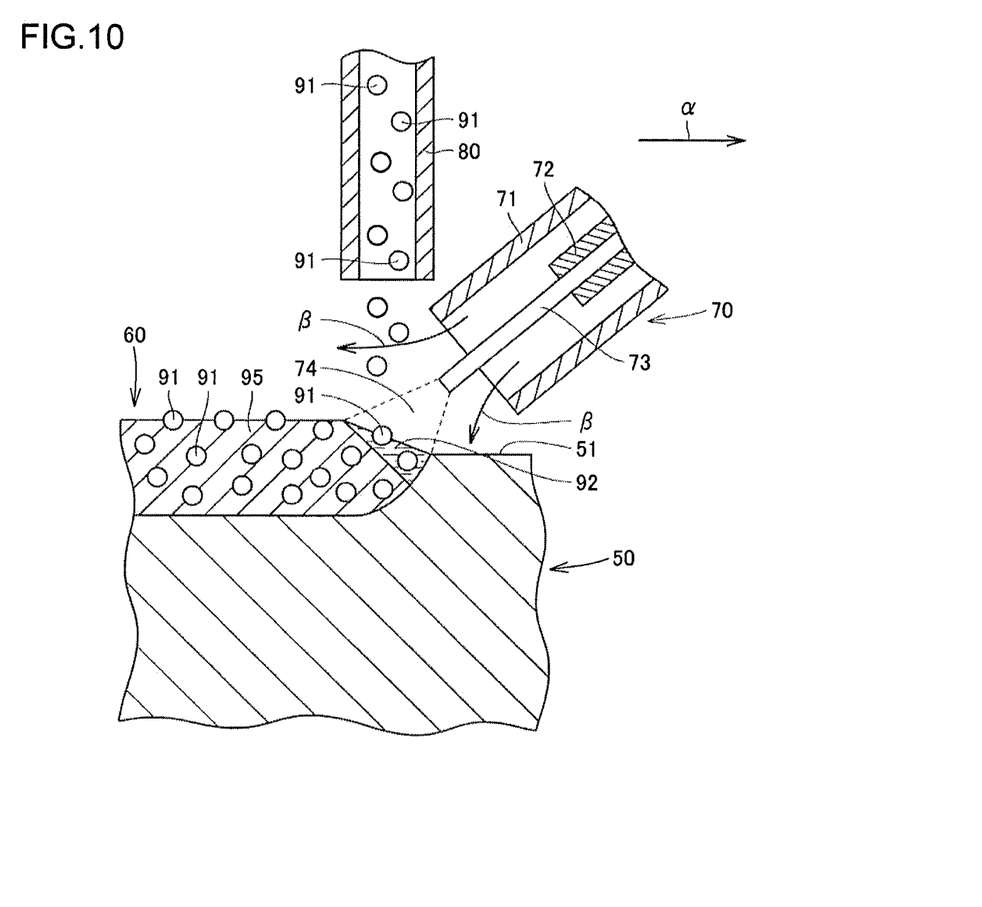
FIG. 10 is a schematic cross-sectional view illustrating a method for forming an overlay.

A method for producing a tooth 20, which is the wear-resistant component in the present embodiment, will now be described with reference to FIGS. 7 to 10. FIG. 7 is a flowchart schematically illustrating a method for producing a tooth. FIGS. 8 and 9 are schematic cross-sectional views illustrating the tooth producing method. FIG. 10 is a schematic cross-sectional view illustrating a method for forming an overlay.

Referring to FIG. 7, in the method for producing a tooth 20 in the present embodiment, first, a base member preparing step is carried out as a step S10. In this step S10, referring to FIG. 8, a base member 50, which is to be a base 25 of the tooth 20, is prepared. The base member 50 is made of a first metal. The base member 50 is of a cylindrical shape. The base member 50 has a cylindrical shape including one end face 52, another end face 53, and a side face 51 connecting the one end face 52 and the other end face 53. A first chamfered portion 52A is formed in a region where the one end face 52 and the side face 51 are connected. A second chamfered portion 53A is formed in a region where the other end face 53 and the side face 51 are connected. Referring to FIGS. 8 and 3, the one end face 52 side of the base member 50 corresponds to the tip end 21 side of the tooth 20, and the other end face 53 side of the base member 50 corresponds to the proximal end 22 side of the tooth 20.

Next, an overlay forming step is carried out as a step S20. In this step S20, referring to FIGS. 8 and 9, an overlay 60 is formed in contact with a covered region 51A that is a part of a surface of the base member 50 prepared in the step S10, to cover the covered region 51A. The overlay 60 is formed such that it will cover a desired region of the base 25 when hot forging is carried out, which will be described later. The covered region 51A can be determined in advance through a simulation of hot forging using a finite element method, for example. In the present embodiment, referring to FIG. 9, the overlay 60 is formed to cover the one end face 52 side of the side face 51, the first chamfered portion 52A, and the one end face 52.

The overlay 60 may be formed by, for example, overlaying welding using $CO_2$ arc welding as described below. First, an overlay forming device will be described. Referring to FIG. 10, the overlay forming device includes a welding torch 70 and a hard particles supplying nozzle 80. The welding torch 70 includes a welding nozzle 71 having a hollow cylindrical shape, and a contact tip 72 disposed inside the welding nozzle 71 and connected to a power source (not shown). A welding wire 73, while being in contact with the contact tip 72, is supplied continuously to the tip end side of the welding nozzle 71. For the welding wire, JIS YGW12, for example, may be adopted. A gap between the welding nozzle 71 and the contact tip 72 is a flow path of shielding gas. The shielding gas flowing through the flow path is discharged from the tip end of the welding nozzle 71. The hard particles supplying nozzle 80 has a hollow cylindrical shape. Inside the hard particles supplying nozzle 80, hard particles 91 are supplied, which are discharged from the tip end of the hard particles supplying nozzle 80.

This overlay forming device can be used to form an overlay 60 in the following procedure. With a base member 50 as one electrode and the welding wire 73 as another electrode, voltage is applied across the base member 50 and the welding wire 73. This generates an arc 74 between the welding wire 73 and the base member 50. The arc 74 is shielded from the ambient air by the shielding gas discharged from the tip end of the welding nozzle 71 along the arrows β. For the shielding gas, carbon dioxide, for example, may be adopted. The heat in the arc 74 melts a part of the base member 50 and also melts the tip end of the welding wire 73. The tip end of the welding wire 73 thus molten forms droplets, which transfer to the molten region of the base member 50. This forms a molten pool 92 which is a liquid region where the molten base member 50 and the molten welding wire 73 are mixed together. The hard particles 91 discharged from the hard particles supplying nozzle 80 are supplied to this molten pool 92.

As the welding torch 70 and the hard particles supplying nozzle 80 constituting the overlaying welding device move relatively in the direction shown by the arrow α with respect to the base member 50, the position where the molten pool 92 is formed move accordingly. The molten pool 92 previously formed solidifies, resulting in an overlay 60. The overlay 60 includes a matrix 95 formed by solidification of the molten pool 92, and hard particles 91 dispersed in the matrix 95. Through the above procedure, the overlay 60 is formed to cover the covered region 51A on the surface of the base member 50. The surface of the base member 50 on which no overlay 60 has been formed is the exposed region 51B. Referring to FIG. 9, a boundary between the covered region 51A and the exposed region 51B is an overlay edge portion 59. It should be noted that overlaying welding may be carried out, for example, under the following conditions: welding current of 230 A, welding voltage of 17 V, hard particles feed rate of 110 g/min, and excess bead height of 4 mm. For the welding wire, JIS YGW11 may be adopted. For the hard particles, WC- or $W_2C$-based particles may be adopted.

Next, a hot forging step is carried out as a step S30. In this step S30, the base member 50 with the overlay 60 formed in the step S20 is hot forged. Referring to FIGS. 9 and 3, the base member 50 with the overlay 60 formed is heated to a temperature enabling hot forging, and then placed in a die having a cavity corresponding to a desired shape of the tooth 20, for forging. With this hot forging, a region of the base member 50 including the overlay edge portion 59 is worked. As a result of hot forging, the overlay edge portion 59 becomes an overlay edge portion 29. With the overlay edge portion 59 worked in hot forging, a tooth 20 is obtained which has the exposed region 25B and a surface 27A of the overlay 27 flush with each other in the overlay edge portion 29. In the overlay edge portion 29, the exposed region 25B and the surface 27A of the overlay 27 form a flush, forged surface corresponding to the region of the surface of the die used in the hot forging where the overlay edge portion 59 is worked. In the overlay edge portion 29, the exposed region 25B and the surface 27A of the overlay 27 form a flush surface corresponding to the shape of the die for forging. The overlay edge portion 29 is included in the forged surface.

Referring to FIGS. 10 and 5, as the base member 50 having the overlay 60 formed is hot forged, hard particles 91 that were protruding from a surface of the overlay 60 during formation of the overlay 60 are pressed into the overlay 60. As a result, in the tooth 20, the hard particles 91 located in the overlay surface region 27B are arranged to contact the surface 27A of the overlay 27 (see FIG. 5). Among the hard particles 91 located in the overlay surface region 27B, any hard particle 91 having a region exposed from the surface 27A of the overlay 27 has an acute central angle θ (of less than 90°) corresponding to the exposed region. This prevents the hard particle 91 from falling off during the use of the tooth 20, leading to improved wear resistance of the tooth 20.

Referring to FIGS. 10 and 6, as the base member 50 having the overlay 60 formed is hot forged, in the tooth 20, protrusions 99 are formed in the overlay 27 in consequence of the hard particles 91 that were located in the vicinity of the interface between the overlay 60 and the base member 50 at the time of formation of the overlay 60. In a protrusion 99, at least a part of a corresponding hard particle 91 is received. The above process simultaneously forms the surface region of the overlay 27 which is excellent in wear resistance with the hard particles 91 arranged in contact with the surface 27A, and the protrusions 99 which prevent the overlay 27 from coming off the base 25.

Referring to FIG. 7, next, a heat treatment step is carried out as a step S40. In this step S40, the tooth 20 obtained through hot forging in the step S30 is subjected to heat treatment. The heat treatment carried out in the step S40 is, for example, quenching and tempering. This imparts desired hardness and toughness to the base 25 of the tooth 20. Through the above procedure, the tooth 20 in the present embodiment is completed.

In the wear-resistant component producing method in the above embodiment, when forming the overlay on the base member, a surface portion of the base member corresponding to the region of the base member where the overlay is to be formed may be removed in advance, or, an undercut portion may be formed in the base member, before formation of the overlay. This reduces the deformation amount of the overlay at the time of forging, thereby preventing, for example, wrinkling of the forged overlay.

Examples

A tooth 20 was produced in a similar procedure as the producing method described in the above embodiment. The structure of the overlay and the like were examined, and a test was also conducted to check penetration resistance of the obtained tooth 20 in clay (Example). For comparison, a tooth was produced in a similar producing method, except that the overlay forming step (step S20) was omitted, and an overlay was formed by overlaying welding after the heat treatment. The obtained tooth was subjected to a similar test (Comparative example). The dies used for hot forging in the Example and in the Comparative example were of the same shape. The details of the tests are as follows.

Figure 11:
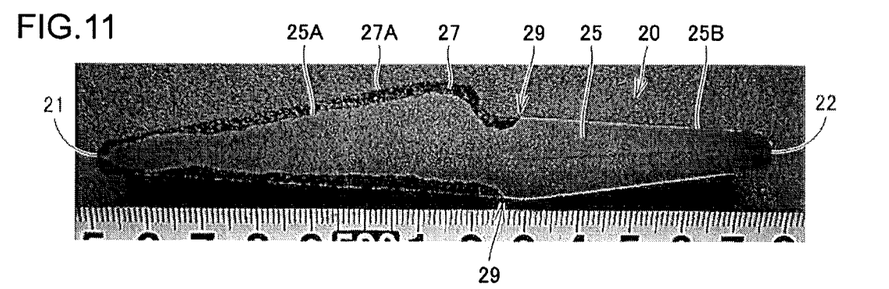
FIG. 11 is a photograph showing a cross section of a tooth.

FIG. 11 is a photograph showing a cross section of the tooth 20 of the Example. Referring to FIG. 11, in the overlay edge portion 29, the exposed region 25B and the surface 27A of the overlay 27 are flush with each other to form a forged surface. It is thus confirmed that the tooth 20 in the above embodiment can be produced by the producing method in the above embodiment. No cracking is seen between the overlay 27 and the base 25. No problem is found resulting from hot forging performed after the formation of the overlay.

Figure 12:
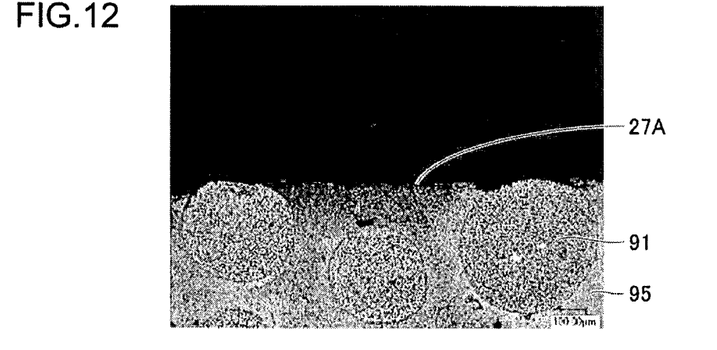
FIG. 12 is an optical micrograph showing a surface and its vicinity of an overlay (Example)
Figure 13:
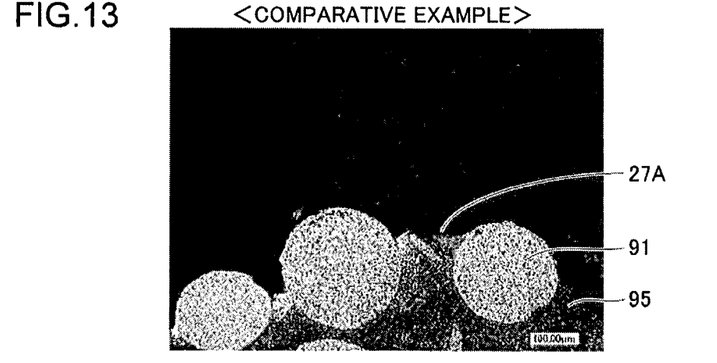
FIG. 13 is an optical micrograph showing a surface and its vicinity of an overlay (Comparative example)

FIG. 12 is an optical micrograph obtained by imaging a surface and its vicinity of the overlay of the Example. FIG. 13 is an optical micrograph obtained by imaging a surface and its vicinity of the overlay of the Comparative example. As shown in FIG. 13, in the overlay of the Comparative example, which has been formed by overlaying welding and not worked by forging thereafter, hard particles 91 protrude noticeably from the surface 27A of the overlay. Referring to FIG. 12, in the overlay of the Example, which has been formed and then worked by forging, hard particles 91 located in the surface region are arranged side by side in the state being embedded in the overlay (matrix 95). The hard particles 91 are aligned in contact with the surface 27A of the overlay 27. A hard particle 91 having a region exposed from the surface 27A of the overlay 27 has an acute central angle $\theta$ (of less than 90°) corresponding to the exposed region. This is presumably because, during the process in which the overlay was worked by forging, the hard particles 91 that were protruding from the surface 27A of the overlay were pressed into the matrix 95 having relatively low hardness.

Figure 14:
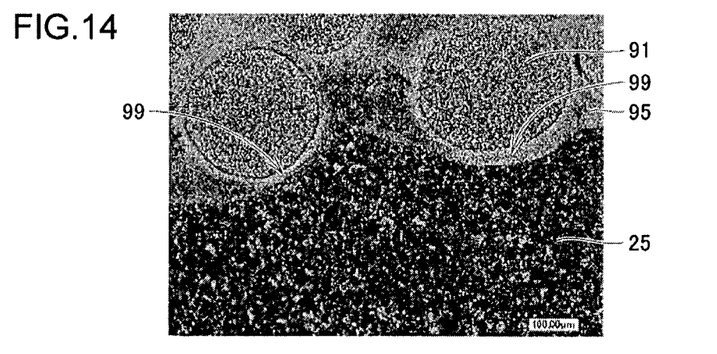
FIG. 14 is an optical micrograph showing an interface between an overlay and a base and its vicinity (Example)
Figure 15:
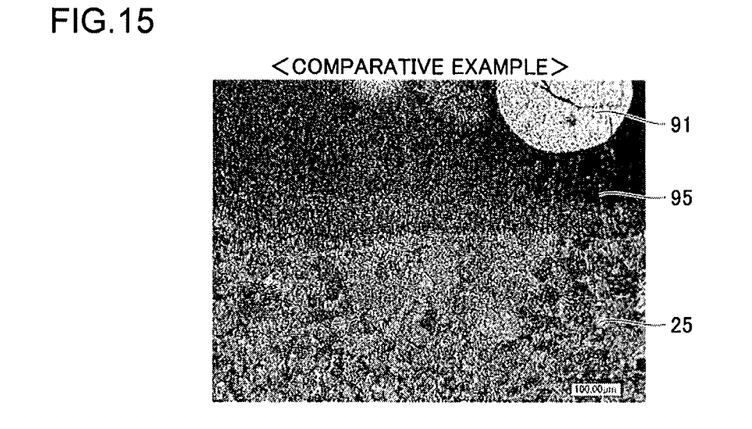
FIG. 15 is an optical micrograph showing an interface between an overlay and a base and its vicinity (Comparative example)

FIG. 14 is an optical micrograph obtained by imaging an interface and its vicinity between the overlay and the base of the Example. FIG. 15 is an optical micrograph obtained by imaging an interface and its vicinity between the overlay and the base of the Comparative example. As shown in FIG. 15, in the Comparative example where the overlay has been formed by overlaying welding and not worked by forging thereafter, the interface between the overlay (matrix 95) and the base 25 is flat. Referring to FIG. 14, in the Example which has been worked by forging after formation of the overlay, in the region including the interface between the overlay (matrix 95) and the base 25, protrusions 99 are formed with the overlay (matrix 95) protruding toward the base 25. In each protrusion 99, a part of a corresponding hard particle 91 is received. It is conceivable that the protrusions 99 have been formed while the overlay was worked by forging, in consequence of the hard particles 91 present in the vicinity of the interface with the base member. A hard particle 91 that has contributed to the formation of a protrusion 99 has at least a part received in the protrusion 99.

Figure 16:
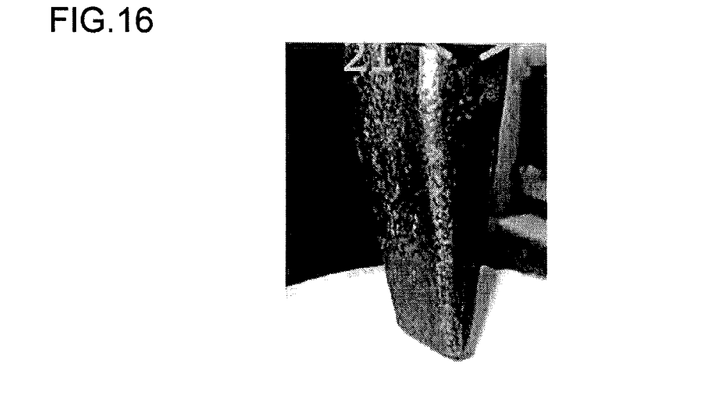
FIG. 16 is a photograph of a tooth subjected to a penetration resistance test (Example)
Figure 17:
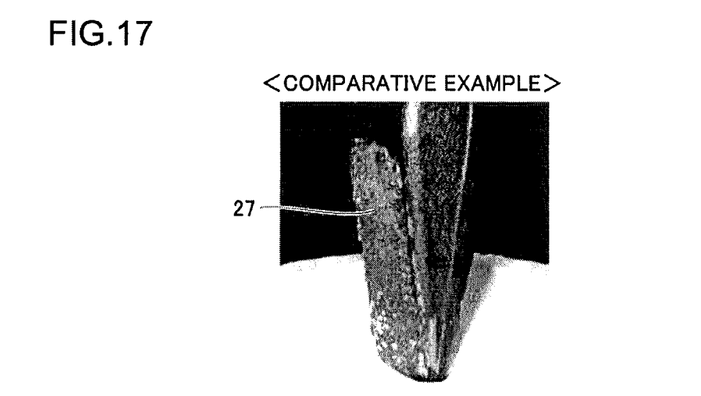
FIG. 17 is a photograph of a tooth subjected to a penetration resistance test (Comparative example)

A penetration resistance test performed on a tooth will now be described. FIG. 16 is a photograph obtained by imaging an appearance of the tooth of the Example subjected to a penetration resistance test. FIG. 17 is a photograph obtained by imaging an appearance of the tooth of the Comparative example subjected to a penetration resistance test. As shown in FIG. 16, in the Example which has been worked by forging after formation of the overlay, the tooth surface is flat. As shown in FIG. 17, in the Comparative example where the overlay has been formed by overlaying welding and not worked by forging thereafter, the overlay 27 is present on the tooth surface, forming a step. The teeth shown in FIGS. 16 and 17 were subjected to tests where the teeth were each caused to penetrate into fat clay assuming earth and sand, and penetration resistance at that time was measured. The displacement velocity of the tooth at the time of penetration was set to 1 mm/sec. Each tooth was caused to penetrate into the fat clay having a flat surface, until the tip end of the tooth reached a position at the depth of 50 mm.

Figure 18:
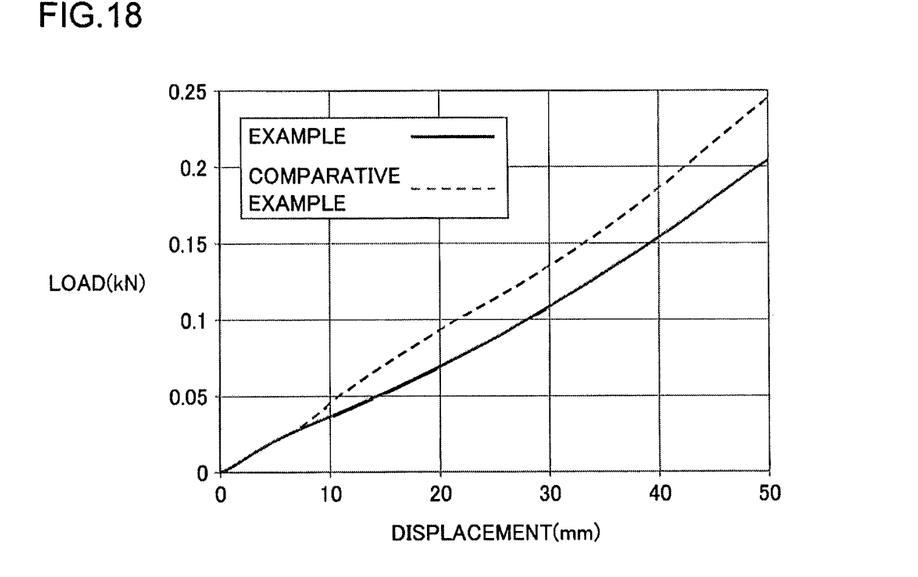
FIG. 18 is a diagram showing the results of the penetration resistance tests.

FIG. 18 is a diagram indicating the results of the penetration resistance tests. In FIG. 18, the solid line and the broken line correspond to the test results of the Example and the Comparative example, respectively. Referring to FIG. 18, the penetration resistance at the time point when the displacement of the tooth reached 50 mm was about 0.25 kN in the Comparative example and about 0.21 kN in the Example. The penetration resistance was reduced by about 15% in the Example compared to the Comparative example. It is thus confirmed that the tooth 20 in the above embodiment, which is the wear-resistant component according to the present invention, can prevent an increase in penetration resistance which is a disadvantage that would otherwise be caused by formation of the overlay 27.

While a bucket tooth for a work machine (hydraulic excavator) was described as an example of the wear-resistant component of the present invention in the above embodiment, not limited thereto, the wear-resistant component according to the present invention is applicable to, for example, a roller, bushing, link, shoe, idler tumbler, sprocket wheel (sprocket tooth) and other components constituting a tracked undercarriage of a work machine, or to a tooth of a crusher for concrete. While a solid tooth for a small-sized hydraulic excavator was described as a bucket tooth in the above embodiment, the wear-resistant component according to the present invention is also applicable to a tooth for a middle- or large-sized hydraulic excavator, which tooth is attached to cover a bucket adapter for use.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The wear-resistant component and its producing method according to the present invention are applicable particularly advantageously to a wear-resistant component having an overlay and to its producing method.

DESCRIPTION OF REFERENCE NUMERALS

1: bucket; 10: main body; 12: periphery of opening; 20: tooth; 21: tip end; 22: proximal end; 25: base; 25A: covered region; 25B: exposed region; 27: overlay; 27A: surface; 27B: overlay surface region; 29: overlay edge portion; 30: mounting portion; 50: base member, 51: side face; 51A: covered region; 51B: exposed region; 52: one end face; 52A: first chamfered portion; 53: other end face; 53A: second chamfered portion; 59: overlay edge portion; 60: overlay; 70: welding torch; 71: welding nozzle; 72: contact tip; 73: welding wire; 74: arc; 80: hard particles supplying nozzle; 91: hard particles; 92: molten pool; 95: matrix; and 99: protrusion.

The invention claimed is:

1. A wear-resistant component, comprising:
a base made of a first metal; and
an overlay disposed in contact with the base to cover a covered region, the covered region being a part of a surface of the base,
wherein:
an exposed region other than the covered region on the surface of the base and a surface of the overlay are flush with each other to form a forged surface in an overlay edge portion corresponding to a boundary between the covered region and the exposed region,
the overlay includes hard particles located in at least an overlay surface region that is within an average particle diameter of the hard particles from the surface of the overlay, and
among the hard particles located in the overlay surface region, any hard particle having a region exposed from the surface of the overlay has an acute central angle corresponding to the region exposed from the surface of the overlay.

2. The wear-resistant component according to claim 1, wherein:
the overlay further includes
a matrix made of a second metal, and
the hard particles are dispersed in the matrix.

3. The wear-resistant component according to claim 2, wherein the hard particles located in the overlay surface region are arranged side by side while being embedded in the overlay.

4. The wear-resistant component according to claim 3, wherein the hard particles located in the overlay surface region are in contact with the surface of the overlay.

5. The wear-resistant component according to claim 2, wherein in a region including an interface between the overlay and the base, the overlay includes a protrusion that protrudes toward the base.

6. The wear-resistant component according to claim 5, wherein the protrusion has at least a part of one of the hard particles received therein.

7. A method for producing the wear-resistant component according to claim 1, comprising the steps of:
preparing the base member made of the first metal;
forming the overlay, which includes the hard particles in the overlay surface region, to come into contact with and cover the covered region; and
forging the base member having the overlay formed, including working the overlay edge portion.

8. The wear-resistant component producing method according to claim 7, wherein the step of forging the base member having the overlay formed includes hot forging the base member having the overlay formed.

9. The wear-resistant component producing method according to claim 7, wherein the step of forming the overlay includes
forming the overlay including a matrix made of a second metal, and
dispersing the hard particles in the matrix.

* * * * *